United States Patent
Ziegler et al.

(10) Patent No.: US 8,696,214 B2
(45) Date of Patent: Apr. 15, 2014

(54) DRAWN BUSHING, PARTICULARLY IN FORM OF A RACEWAY BUSHING FOR AN AUTOMATIC TRANSMISSION

(75) Inventors: Andreas Ziegler, Charlotte, NC (US); Alexander Pabst, Erlangen (DE); Frank Beeck, Erlangen (DE); Dieter Hauck, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 91 days.

(21) Appl. No.: 13/281,098

(22) Filed: Oct. 25, 2011

(65) Prior Publication Data

US 2013/0067684 A1 Mar. 21, 2013

(30) Foreign Application Priority Data

Sep. 20, 2011 (DE) .......................... 10 2011 083 046

(51) Int. Cl.
*F16C 33/58* (2006.01)
*B29D 33/00* (2010.01)

(52) U.S. Cl.
USPC .................................... 384/569; 29/898.054

(58) Field of Classification Search
USPC ................. 384/296, 515, 560, 564, 569, 276; 29/898.054, 898.056, 898.057
See application file for complete search history.

(56) References Cited

U.S. PATENT DOCUMENTS

| | | | | |
|---|---|---|---|---|
| 2,038,475 A | * | 4/1936 | Brown | 384/559 |
| 3,529,876 A | * | 9/1970 | Pitner | 384/569 |
| 4,350,397 A | * | 9/1982 | Cornish et al. | 384/569 |
| 4,565,458 A | * | 1/1986 | Achee et al. | 384/561 |
| 4,917,509 A | * | 4/1990 | Takano | 384/275 |
| 6,419,398 B1 | * | 7/2002 | Murphy et al. | 384/569 |

* cited by examiner

*Primary Examiner* — Phillip A Johnson
(74) *Attorney, Agent, or Firm* — Lucas & Mercanti, LLP

(57) ABSTRACT

A raceway bushing which has a substantially cylindrical peripheral wall that forms a bushing inner surface and a bushing outer surface, a bottom wall which extends from the peripheral wall and has an inner bottom surface and an outer bottom surface, and a bottom opening configured in the bottom wall. The bottom opening is bordered by an annular collar that rises axially beyond the inner bottom surface.

15 Claims, 2 Drawing Sheets

DRAWN BUSHING, PARTICULARLY IN FORM OF A RACEWAY BUSHING FOR AN AUTOMATIC TRANSMISSION

CROSS-REFERENCE TO RELATED APPLICATION

This application claims the priority of DE 10 2011 083 046.4 filed Sep. 20, 2011, which is incorporated by reference herein.

FIELD OF THE INVENTION

The invention relates to a drawn bushing comprising a substantially cylindrical peripheral wall and bottom wall comprising a bottom hole configured therein.

BACKGROUND OF THE INVENTION

Raceway bushings of the pre-cited type are used particularly as so-called raceway bushings in automatic transmissions and form, in the installed position, a running surface with which the rolling elements of a rolling bearing, particularly a needle roller bearing, can be in rolling contact. Running bushings of the pre-cited type can be made as seamless, drawn components. Through the shaping by drawing, it is possible to obtain surface qualities and component geometries which, in many cases of use, correspond directly to the requirements made of a rolling element running surface.

Automatic transmissions make very high demands on the compactness and the system weight. High component compactness and a high degree of integration are predominant features of established transmissions and are obtained through multiple functions allocated to individual components. Thus, for example, it is likewise known to integrate, in conjunction with a drawn raceway bushing, oil conveying und closing structures which can offer oil conveying und valve functions within an automatic transmission.

OBJECT OF THE INVENTION

The object of the invention is to provide solutions which make it possible in a relatively economic manner from the production point of view to achieve an improvement of the functioning properties of a raceway bushing, particularly when these are used in an automatic transmission.

SUMMARY OF THE INVENTION

This object is realized according to the invention through a raceway bushing comprising: a substantially cylindrical peripheral wall that forms a bushing inner surface and a bushing outer surface, a bottom wall comprising an inner bottom surface and an outer bottom surface, and a bottom opening configured in the bottom wall, wherein the bottom opening is bordered by an annular collar that rises axially beyond the inner bottom surface.

Through the inventive concept it becomes possible to realize in the case of the outer bottom surface, close shape tolerances, e.g. a perpendicularity of less than +/−30 μm relative to the bushing axis. The bottom can thus form a stop surface for a connecting component, so that through the interaction of these two components, a valve and sealing surface system can be created. The high precision of shape, particularly the perpendicularity makes it possible to seal the abutting piston that is filled with oil. The requirement of perpendicularity can be met reliably through the inventive concept, so that excessive leakage can be prevented at this sealing point and the overall function of the system improved. Further, hitherto required finishing, particularly mechanical machining of such components for improving the component geometry, can now be dispensed with.

The inventive concept makes it further possible to create a bushing structure in which under typical loads of an installed state, particularly in the case of an interference fit on the peripheral wall, the bottom wall attains its ideal geometry.

The collar formed by a shaping method on the inventive drawn ring in the radial bottom wall enhances the rigidity of the bottom of the bushing and, in the framework of the shaping process, also leads to internal increase in rigidity und, contributes, in the final analysis, to assuring that the required geometry, particularly perpendicularity, is attained and also maintained adequately exactly during installation of the bushing in the housing.

The invention is preferably for use in automatic transmissions in which a multiplicity of component functions is to he guaranteed. On the one hand, the component serves as a raceway, for sealing and also as a high-precision stop for connecting components.

According to a particularly preferred form of embodiment of the invention, the raceway bushing is configured such that the bottom wall is directed perpendicularly with respect to the bushing axis. In this way, the thus configured raceway bushing can form a stop surface for a connecting component that likewise comprises a flat, radially directed end surface. The surfaces in contact with each other can then form a valve mechanism which goes into a closing state when the highly flat surfaces make a correspondingly flat contact with each other.

The bottom opening is preferably arranged concentric to the bushing axis. Through this, substantially identical structural mechanical properties result in the entire wall region bordering the bottom opening. As a result, if necessary, the inventive raceway bushing can be installed around the bushing axis without special attention having to be paid to its orientation.

The wall thickness of the bottom wall is preferably larger than the wall thickness of the peripheral wall. In this way, a high axial and radial rigidity of the bottom wall is obtained and its undesired vaulting under the action of the forces acting on the bushing wall is precluded.

According to a special aspect of the present invention, the transition region between the annular collar and the bottom wall is configured as a region rounded through a radius, the transition radius of the inner wall of the annular collar turned towards the bushing axis into the outer bottom surface being larger than the inner corner radius between the outer peripheral wall of the annular collar and the bottom inner surface.

The annular collar is preferably configured in a substantially cylindrical shape. The annular collar can be configured such that its radial wall thickness is somewhat smaller than the axial wall thickness of the bottom wall. If sufficient design space is available, the annular collar can also be formed by an extrusion shaping method through which more complex detail geometries, e.g. stepped peripheral surfaces and distinct front-end bevels can be obtained.

The transition from the bushing outer surface into the bottom outer surface is likewise realized preferably through a rounded region. In this region adjoining the bottom surface, a peripheral step can be configured on the peripheral wall so that the wall thickness of the peripheral wall is reduced through the peripheral step and a narrow annular region is formed which recedes in radial direction under the diameter level of the outer peripheral wall. Through this measure it is achieved that the pressing forces acting on the bushing peripheral wall for realizing the interference fit of the raceway bushing do not act directly on the outer peripheral region of the bottom wall. In this way, a certain reduction of radial load on the bottom wall is achieved and the danger of bellying or vaulting due to radial forces is prevented.

The bottom opening configured in the bottom wall is preferably formed in that material of the base material blank at this location is at least partially shaped into the annular collar. In the framework of a shaping by deep drawing, it is possible to at first to make a structural component in which the annular collar is configured in the bottom wall but is still closed. The bottom opening can then formed by an adequate punching Of the cover region. Alternatively, it is also possible to form the bottom opening in that, at first, a punch hole with a smaller diameter is formed and then widened with help of a mandrel section to form the annular collar.

In the inventive raceway bushing an annular rim is formed preferably in the region of a front end turned away from the bottom wall and this annular rim rises radially beyond the bushing outer surface. This annular rim can serve as a push-in limiter which, as such, limits the axial insertion depth of the raceway bushing into a reception bore. The geometry of this annular rim can be configured such that it can sink into a peripheral bevel of the reception bore and, thus, does not protrude or protrudes only slightly in axial direction beyond a front surface surrounding the reception bore.

In the installed state, preferably, the inner surface of the raceway bushing forms a running surface on which the needle rollers of a needle roller bearing can be in rolling contact. The inner surface can further also form a sealing surface on which sealing elements, particularly sealing rings or sealing lips run. The aforesaid annular rim on the axial end region of the raceway bushing is preferably configured such that said sealing elements can be pushed in gently and without damage into the raceway bushing. For this purpose, the annular rim can form on its inner side facing the bushing axis, a slightly conical inner wall which transits smoothly into the bushing inner wall.

The invention further relates to an automatic transmission in which through interaction with a raceway bushing of the pre-cited type, a stop and valve function is realized.

BRIEF DESCRIPTION OF THE DRAWINGS

Further details and features of the invention result from the following description with reference to the appended drawing.

DETAILED DESCRIPTION OF THE INVENTION

Figure 1:
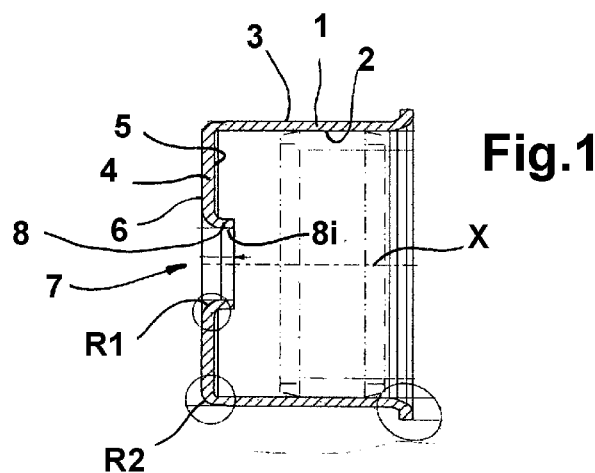
FIG. 1 shows an axial sectional illustration of a raceway bushing according to the invention for an automatic transmission.

FIG. 1 illustrates a raceway bushing according to the invention for an automatic transmission. The raceway bushing comprises a substantially cylindrical peripheral wall 1 that forms a bushing inner surface 2 and a bushing outer surface 3. The raceway bushing further comprises a bottom wall 4 comprising an inner bottom surface 5 and an outer bottom surface 6.

A bottom opening 7 is configured in the bottom wall 4. This bottom opening 7 is bordered by an annular collar 8 which rises in axial direction beyond the inner bottom surface 5. The raceway bushing is configured such that the bottom wall 4 is oriented at right angles to the bushing axis. The outer bottom surface 6 forms a highly flat annular region that is oriented with close tolerances in radial direction and functions as a stop and sealing surface.

The bottom opening 7 is arranged concentrically to the bushing axis X. The annular collar 8 is likewise configured to be concentric to said bushing axis X. The wall thickness of the bottom wall 4 in this case is larger than the wall thickness of the peripheral wall 1. In this way, a high rigidity of the bottom wall 4 is attained.

The inner wall $8i$ of the annular collar 8 merges through a radius R1 into the outer bottom surface 6. The bushing outer surface 3 merges through a radius R2 into the outer bottom surface 6. In the transition region to said radius R2, the peripheral wall 1 comprises a reduced outer diameter and a reduced wall thickness. In this way, a certain radial uncoupling of the bottom wall 4 from any interference fit forces acting in radial direction on the peripheral wall 1 is achieved.

The bottom opening 7 is made out of a base material blank during a shaping step by shaping material to form the annular collar. Forming of the bottom opening and the annular collar can be performed either in the framework of a shaping step preceding the actual deep drawing step of the bushing or only towards the end of or following the deep drawing step that leads to the forming of the bushing. The deep drawing procedure is preferably performed in the order that at first the deep drawing plunger is introduced and pressed into the outer die such that, towards the end of the drawing process, another press-shaping occurs in which the geometry existing in the remaining lower die space between the front end of the pressing die and the outer die is forced upon the bottom wall and the annular collar 8. Diversion of material out of this lower die space is avoided particularly through the wall thickness constriction in the region of the radius R2, so that the peripheral wall 1 in itself is a pure drawn structure which, if necessary, receives a certain calibration through the plunger and the outer die. Removal of the finished raceway bushing out of the outer die is performed preferably in that, prior to pulling-out of the pressing die, the component is pushed out of the outer die by a counter die supporting the bottom wall.

The raceway bushing according to the invention can be made out of a coated material and this coating can be removed after termination of the shaping process, e.g. by an electrochemical means.

Figure 2:
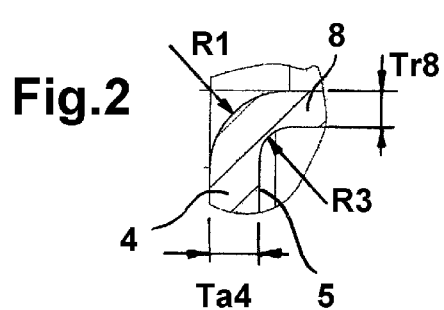
FIG. 2 shows a detail illustration for depicting the geometry of the raceway bushing of FIG. 1 in the transition region between the bottom wall and the annular collar.

In the form of a detail illustration, FIG. 2 shows the transition between the bottom wall 4 and the annular collar 8. As can be seen, the transition is achieved through an annular zone forming a radius R1. In the inner corner region between the annular collar 8 and the inner bottom surface 5, a radius R3 is likewise formed by an annular zone. The radius R3 is smaller than the radius R1. The radial wall thickness Tr8 is likewise smaller than the axial wall thickness Ta4. The axial salient length of the annular collar 8 beyond the bottom inner surface 5 corresponds preferably 1.7 to 3 times the axial wall thickness Ta4 of the bottom wall 4.

Figure 3:
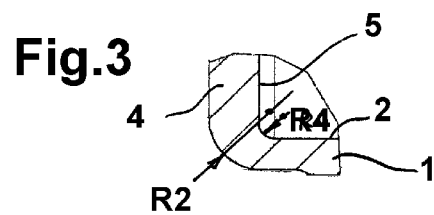
FIG. 3 shows a detail illustration for depicting the geometry of the raceway bushing of FIG. 1 in the transition region between the peripheral wall and the bottom wall.

In the form of a detail illustration, FIG. 3 shows the corner transition region between the peripheral wall 1 and the bottom wall 4. As can be seen in, this illustration, the peripheral wall 1 in this region is slightly receded in radial direction and has a smaller outer diameter in this region than in the rest of the regions of the peripheral wall. This wall thickness reduction corresponds approximately to 5 to 25% of the radial wall thickness of the peripheral wall 1. The radius R2 corresponds preferably 1.5 to 2.2 times the axial thickness of the bottom wall 4. The centers of the radii R2 and R4 are offset to each other. The inner radius R4 between the inner peripheral surface 2 and the bottom inner surface 5 is smaller than the radius R2.

Figure 4:
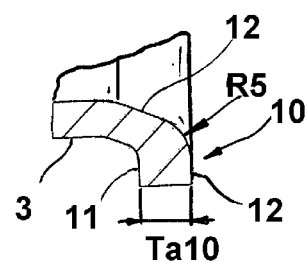
FIG. 4 shows a detail illustration for depicting the geometry of the raceway bushing of FIG. 1 in its end region turned away from the bottom wall.

FIG. 4 shows a further detail of the raceway bushing according to the invention. This figure shows the axial end region of the raceway bushing turned away from the bottom wall 4. As can be seen, this axial end region comprises an annular rim 10 which protrudes in radial direction beyond the bushing outer surface 3. The radial salient length beyond the outer surface 3 corresponds approximately to 1.1 to 2.2 times the radial of the outer wall 1. The annular rim 10 forms an annular seating surface 11 through which the axial insertion depth of the raceway bushing in a reception structure is defined. In the inner region of the annular rim 10, a conical zone 12 is configured which merges with a radius R5 into a front end surface 12. The annular seating surface 11 and the end surface form two substantially parallel, flat annular surfaces that are oriented radially with respect to the bushing axis X. The axial height Ta10 of this annular rim 10 corresponds approximately to 1.1 to 1.6 times the radial wall thickness of the peripheral wall 1 in the non-reduced region.

Figure 5:
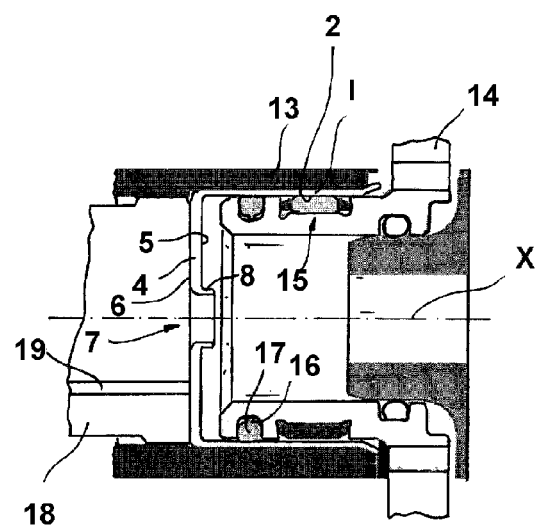
FIG. 5 shows an axial sectional illustration for depicting the installation situation in an automatic transmission formed with integration of the raceway bushing according to the invention.

FIG. 5 illustrates an installation situation of a raceway bushing 1 according to the invention in an automatic transmission. The raceway bushing 1 is seated with a slight interference fit in a transmission component 13. A rotating component 14 is supported through a needle roller bearing 15 in the raceway bushing 1. The needle rollers of the needle roller bearing 15 are in rolling contact with the inner peripheral surface 2 of the raceway bushing 1. A circumferential groove 16 configured in the rotating component 14 serves to seat a sealing ring 17 that likewise runs on the inner peripheral surface 2 of the raceway bushing 1.

As already discussed in connection with FIG. 1, the raceway bushing 1 comprises, in addition to the substantially cylindrical peripheral wall 1, a bottom wall 4 comprising an inner bottom surface 5 and an outer bottom surface 6.

A bottom opening 7 is configured in the bottom wall 4. According to the invention, this bottom opening 7 is bordered by an annular collar 8 that rises in axial direction beyond the inner bottom surface 5. The raceway bushing is configured such that the bottom wall 4 is oriented perpendicularly to the bushing axis. The outer bottom surface 6 forms a highly flat annular region that is oriented with close tolerances in radial direction and functions as a stop and sealing surface for a journal 18. An oil bore 19 configured in the journal 18 can be closed by the bottom wall 4. Through the inventive design of the raceway bushing 1, it is achieved that the bottom wall 4 attains a high structural rigidity and a high precision of shape. In this way, through the interaction with the journal 18, a valve device is realized through which, upon abutment of the journal 18 on the bottom wall 4, the oil channel 19 can be reliably closed.

The invention claimed is:

1. A raceway bushing, comprising:
    a substantially cylindrical peripheral wall forming a bushing inner surface and a bushing outer surface;
    a bottom wall extending from the peripheral wall and forming an inner bottom surface and an outer bottom surface, a bottom opening being formed in the bottom wall; and
    an annular collar bordering the bottom opening and extending axially from the bottom wall, beyond the inner bottom surface,
    wherein the peripheral wall has an end region away from the bottom wall, an annular rim being provided at the end region of the peripheral wall so that the annular rim rises in a radial direction beyond the bushing outer surface, an axial thickness of the annular rim relative to a center axis of the bushing being 1.1 to 1.6 times a radial wall thickness of the peripheral wall.

2. The raceway bushing according to claim 1, wherein the bottom wall is perpendicular to the center axis of the bushing.

3. The raceway bushing according to claim 2, wherein the bottom opening is concentric to the center axis.

4. The raceway bushing according to claim 3, wherein the bottom wall has a wall thickness that is larger than a wall thickness of the peripheral wall.

5. The raceway bushing according to claim 1, wherein the annular collar has an inner wall that merges into the outer bottom surface through a radius.

6. The raceway bushing according to claim 1, wherein the bushing outer surface merges into the outer bottom surface through a radius.

7. The raceway bushing according to claim 6, wherein the peripheral wall has a reduced outer diameter in a transition region extending to the radius.

8. The raceway bushing according to claim 1, wherein the bottom wall is shaped to form the annular collar at the bottom opening, and the annular collar has a wall thickness that is smaller than a wall thickness of the bottom wall.

9. A raceway bushing, comprising:
    a substantially cylindrical peripheral wall forming a bushing inner surface and a bushing outer surface;
    a bottom wall extending from the peripheral wall and forming an inner bottom surface and an outer bottom surface, a bottom opening being formed in the bottom wall; and
    an annular collar bordering the bottom opening and extending axially, with respect to a center axis of the bushing, from the bottom wall, beyond the inner bottom surface by an axial length of 1.7 to 3 times an axial wall thickness of the bottom wall.

10. The raceway bushing according to claim 9, wherein the peripheral wall has an end region away from the bottom wall, an annular rim being provided at the end region of the peripheral wall so that the annular rim rises in a radial direction beyond the bushing outer surface, an axial thickness of the annular rim relative to a center axis of the bushing being 1.1 to 1.6 times a radial wall thickness of the peripheral wall.

11. The raceway bushing according to claim 9, wherein the bushing outer surface merges into the outer bottom surface through a first radius and the peripheral wall has a reduced outer diameter in a transition region extending to the first radius, the reduced diameter of the transition region corresponds approximately to 5 to 25% reduction of a radial wall thickness of the peripheral wall in the transition region.

12. The raceway bushing according to claim 11, wherein the first radius corresponds to 1.5 to 2.2 times an axial thickness of the bottom wall.

13. A raceway bushing in combination with a connection element, the raceway bushing comprising:
    a substantially cylindrical peripheral wall forming a bushing inner surface and a bushing outer surface;
    a bottom wall extending from the peripheral wall and forming an inner bottom surface and an outer bottom surface, a bottom opening being formed in the bottom wall, wherein the bottom wall has a wall thickness that is larger than a wall thickness of the peripheral wall; and an annular collar bordering the bottom opening and extending axially from the bottom wall, beyond the inner bottom surface, the connection element having a front surface facing the outer bottom surface and a bore opening at the front surface, wherein the front surface and the outer bottom surface are configured so that the opening is sealed when the front surface abuts the outer bottom surface, whereby the front surface and the outer bottom surface form a valve.

14. The raceway bushing of claim 13, wherein the annular collar extends axially beyond the inner bottom surface by an axial length of 1.7 to 3 times an axial wall thickness of the bottom wall with respect to a center axis of the bushing.

15. The raceway bushing of claim 13, wherein the peripheral wall has an end region away from the bottom wall, an annular rim being provided at the end region of the peripheral wall so that the annular rim rises in a radial direction beyond the bushing outer surface, an axial thickness of the annular rim relative to a center axis of the bushing being 1.1 to 1.6 times a radial wall thickness of the peripheral wall.

* * * * *